No. 767,153. PATENTED AUG. 9, 1904.
S. V. KENNEDY & C. S. SHARP.
DEVICE FOR FASTENING TEETH TO HARROWS OR CULTIVATORS.
APPLICATION FILED MAR. 21, 1904.
NO MODEL.
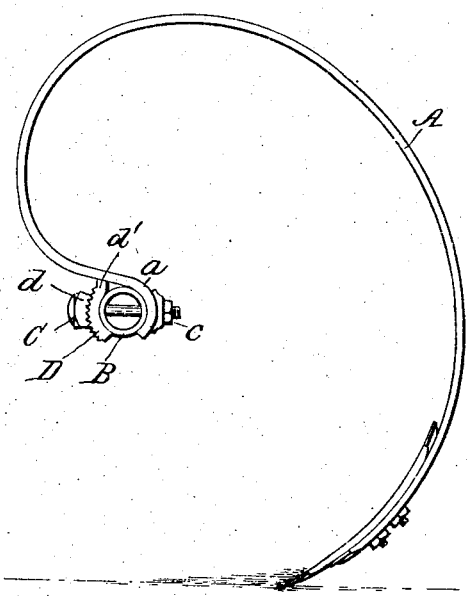
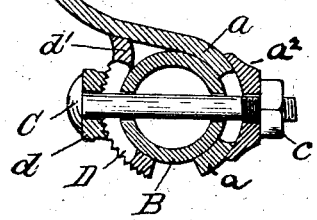
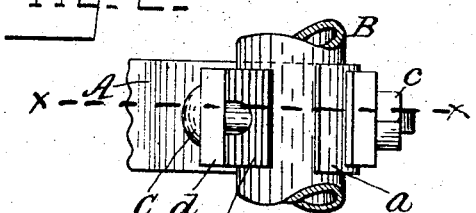
Witnesses. Inventors.

No. 767,153. Patented August 9, 1904.

UNITED STATES PATENT OFFICE.

SAMUEL V. KENNEDY AND CHARLES S. SHARP, OF AUBURN, NEW YORK, ASSIGNORS TO D. M. OSBORNE AND COMPANY, OF AUBURN, NEW YORK, A CORPORATION OF NEW YORK.

DEVICE FOR FASTENING TEETH TO HARROWS OR CULTIVATORS.

SPECIFICATION forming part of Letters Patent No. 767,153, dated August 9, 1904.

Application filed March 21, 1904. Serial No. 199,205. (No model.)

*To all whom it may concern:*

Be it known that we, SAMUEL V. KENNEDY and CHARLES S. SHARP, citizens of the United States, residing at Auburn, county of Cayuga, and State of New York, have invented certain new and useful Improvements in Devices for Fastening Teeth to Harrows or Cultivators, of which the following is a specification.

The object of our invention is to provide a device for fastening harrow or cultivator teeth to their bars or supports, so that they may be readily adjusted to regulate the depth of cultivation or to compensate for wear.

In the accompanying drawings, Figure 1 is a side view of a spring-tooth secured to its support by our device. Fig. 2 is a bottom plan view of Fig. 1, the tooth being broken away; and Fig. 3 is a section on the line $x\,x$ of Fig. 2.

A is a harrow or cultivator tooth, its inner end $a$ formed to grasp the surface of a bar or support B, to which it is secured by a bolt C, which passes through all the parts of our device, and the bar B, locking them firmly together by means of the nut $c$. The end $a$ of the tooth A is slotted and has a concave washer $a^2$ interposed between it and the nut $c$ of the bolt C. On the opposite side of the bar or support B is a slotted casting D, its outer surface serrated to mesh with a serrated washer $d$ between it and the head of the bolt C. The upper end $d'$ of the casting D is in intimate contact with the tooth A and, it will be readily observed, acts as a brace to the bend of the tooth A when the latter is being used in cultivation and also limits the range of upward adjustment.

To adjust the tooth, the various parts of the fastening device are loosened by turning the nut $c$ on the bolt C until the latter can be moved a sufficient distance longitudinally to disengage the serrated casting D and washer $d$. The tooth is then moved on the bar or support B as far as may be desired or to the limit of the slot $c'$. The casting D is then adjusted into contact with the tooth A, the serrated washer $d$ is moved in mesh with the serrated casting D, and by operation of the nut $c$ the parts are again drawn together and held firmly in position until further adjustment is desired or it is intended to dismount the tooth.

Having thus described our invention, what we claim, and desire to secure by Letters Patent, is—

1. In a fastening for harrow-teeth or the like, the combination of a bar or support, a tooth adjustably clamped to one side of the bar and reversely curved over the top of the same, and an adjustable casting on the opposite side of the bar and in contact with the rear of the tooth to reinforce the latter and limit its adjustment.

2. In a fastening for harrow-teeth or the like, the combination of a bar or support, a tooth thereon fitting the bar on one side, a slot in the tooth, a washer over the slot, a serrated casting on the opposite side of the bar, a slot in the casting, a serrated washer engaging with the casting, and a bolt passing through the various parts to hold them together.

3. In a fastener for harrow-teeth or the like, the combination of a bar or support, a tooth having a slotted end clamped to one side of the bar and reversely curved over the top of the same, a washer over the slot, a slotted casting on the opposite side of the bar having one end engaging the under side of the tooth to brace and reinforce the same, a washer over the casting, and a bolt passing through all the parts to clamp them together.

In testimony whereof we hereunto set our hands, this 17th day of March, 1904, in the presence of two attesting witnesses.

SAMUEL V. KENNEDY.
    CHARLES S. SHARP.

Witnesses:
    ELMER W. STUPP,
    FRED L. ATHERLY.